United States Patent
Zhai et al.

(10) Patent No.: US 12,544,370 B2
(45) Date of Patent: *Feb. 10, 2026

(54) METHODS FOR CANCER THERAPY

(71) Applicants: ASCENTAGE PHARMA (SUZHOU) CO., LTD., Suzhou (CN); ASCENTAGE PHARMA GROUP CORP LIMITED, Wanchai (CN)

(72) Inventors: Yifan Zhai, Suzhou (CN); Zi Chen, Suzhou (CN); Qian Jiang, Beijing (CN); Xiaojun Huang, Beijing (CN); Wei Liu, Suzhou (CN); Dajun Yang, Suzhou (CN)

(73) Assignee: ASCENTAGE PHARMA (SUZHOU) CO., LTD. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,796

(22) Filed: Sep. 25, 2023

(65) Prior Publication Data

US 2024/0122921 A1    Apr. 18, 2024

Related U.S. Application Data

(63) Continuation of application No. 16/646,304, filed as application No. PCT/CN2019/122384 on Dec. 2, 2019, now abandoned.

(30) Foreign Application Priority Data

Dec. 3, 2018   (WO) ............... PCT/CN2018/119018
Nov. 13, 2019  (CN) ......................... 201911105704.4

(51) Int. Cl.
*A61K 31/496*    (2006.01)
*A61P 35/00*     (2006.01)

(52) U.S. Cl.
CPC ............ *A61K 31/496* (2013.01); *A61P 35/00* (2018.01)

(58) Field of Classification Search
CPC ............................. A61K 31/496; A61P 35/00
See application file for complete search history.

(56) References Cited

U.S. PATENT DOCUMENTS

2022/0142975 A1*  5/2022  Zhai .................. A61K 31/407

FOREIGN PATENT DOCUMENTS

WO       2012000304 A1     1/2012

OTHER PUBLICATIONS

Zabriskie MS, et al. BCR-ABL1 compound mutations combining key kinase domain positions confer clinical resistance to ponatinib in Ph chromosome-positive leukemia. Cancer Cell. 2014;26(3):428-42.*
Ren, Xiaomei, et al "Identification of GZDB24 as an Orally Bioavailable Inhibitor that targets Phosphorylated and Nonphosphorylated Breakpoint Cluster Region-Abelson (Bcr-Abl) Kinase and Overcomes Clinically Acquired Mutation-Induced Resistance against Imatinib." Journal of Medicinal Chemistry, vol. 56, No. 3, Jan. 9, 2013, pp. 879-894.
PCT/CN2019/122384 ISR dated Mar. 4, 2020, 3 pages.

* cited by examiner

*Primary Examiner* — Alicia L Otton
(74) *Attorney, Agent, or Firm* — Honigman LLP; Lucy X. Yang; Li Gao

(57) ABSTRACT

The present invention relates to methods for treating patients with cancer, including patients with hematological malignancy, wherein the method comprises administering to the patient a therapeutically effective amount of a compound of formula (I), or a pharmaceutically acceptable salt thereof, wherein $R^1$ and $R^2$ are as defined herein.

(I)

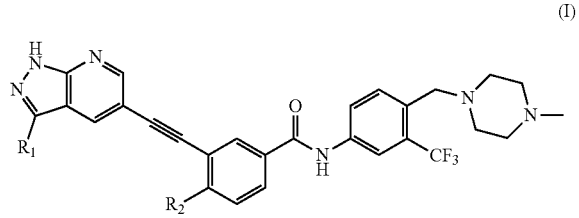

10 Claims, 8 Drawing Sheets

Plasma Concentration Profiles

The response rate and the depth of response of the compound of formula (I-A) in CML-CP patients The progression free survival (PFS) rate of the compound of formula (I-A) in CML patients

METHODS FOR CANCER THERAPY

CROSS REFERENCE TO RELATED APPLICATIONS

This application is a continuation of U.S. patent application Ser. No. 16/646,304 filed Mar. 11, 2020, which is a § 371 of International Application No. PCT/CN2019/122384 filed Dec. 2, 2019, which claims priority to Chinese Application No. CN201911105704.4 filed Nov. 13, 2019 and also claims priority to PCT Application No. PCT/CN2018/119018 filed Dec. 3, 2018, the disclosures of which are considered part of the disclosure of this application and are hereby incorporated by reference in their entireties.

FIELD OF THE INVENTION

The present invention relates to methods for treating patients with cancer, including patients with hematological malignancy.

BACKGROUND OF THE INVENTION

Cancer has a major impact on society across the world. Cancer is the second most common cause after cardiovascular disease responsible for human death. The National Cancer Institute estimates that in 2015, approximately 1,658,370 new cases of cancer will be diagnosed in the United States and 589,430 people will die from the disease.

Chronic myeloid leukemia (CML) is a type of cancer that starts in certain blood forming cells of the bone marrow. CML cells contain an abnormal gene, BCR-ABL, that isn't found in normal cells. This gene makes a protein, BCR-ABL, which causes CML cells to grow and reproduce out of control. BCR-ABL is a type of protein known as a tyrosine kinase. Drugs known as tyrosine kinase inhibitors (TKIs) that target BCR-ABL are the standard treatment for CML.

Imatinib (Gleevec®) is the first drug to specifically target the BCR-ABL tyrosine kinase protein for treating CML. However, emerging acquired resistance to imatinib has become a major challenge for clinical management of CML. More than 100 resistance-related BCR-ABL mutants have been identified in the clinic, among which the "gatekeeper" T315I is most common mutation, as it accounts for approximately 15-20% of all clinically acquired mutants. Ren et al., *J. Med Chem.* 2013, 56, 879-894.

Great efforts have been devoted to identifying second generation of BCR-ABL inhibitors to overcome imatinib resistance. Nonetheless, the second-generation inhibitors are not capable of inhibiting the most refractory BCR-ABL$^{T315I}$ mutant. BCR-ABL$^{T315I}$ induced drug resistance remains an unmet clinical challenge for CML treatment. Accordingly, there is a continuing need for new and more effective treatment. The methods of the present invention present cancer patients with new options.

SUMMARY OF THE INVENTION

The present invention relates methods for treating cancer in a patient, comprising administering to the patient a therapeutically effective amount of a compound of formula (I):

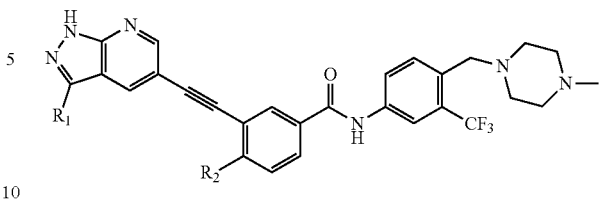

or a pharmaceutically acceptable salt thereof, wherein $R_1$ is hydrogen, $C_{1-4}$ alkyl, $C_{3-6}$ cycloalkyl, $C_{1-4}$ alkyloxy, or phenyl; and $R_2$ is hydrogen, $C_{1-4}$ alkyl, $C_{3-6}$ cycloalkyl, or halogen.

In certain embodiments, the cancer is hematological malignancy.

In certain embodiments, the hematological malignancy is leukemia, including chronic myelogenous leukemia.

In certain embodiments, the method is in the treatment of the patient with chronic myeloid leukemia resistant to current tyrosine kinase inhibitor therapies.

In certain embodiments, the patient with chronic myeloid leukemia resistant to the current tyrosine kinase inhibitor therapies is caused by BCR-ABL mutations.

In certain embodiments, BCR-ABL mutation is T315I, E255K/V, G250E, H396P, M351T, Q252H, Y253F/H, or BCR-ABL$^{WT}$ mutations.

In certain embodiments, BCR-ABL mutation is T315I mutation.

In certain embodiments, the compound of formula (I), or pharmaceutically acceptable salt thereof is administered orally to the patients in need such treatment.

In certain embodiments, the compound of formula (I), or pharmaceutically acceptable salt thereof is administered once every other day (QOD) during the 28-day treatment cycle.

In one embodiment, the compound of formula (I) is a compound of formula (I-A):

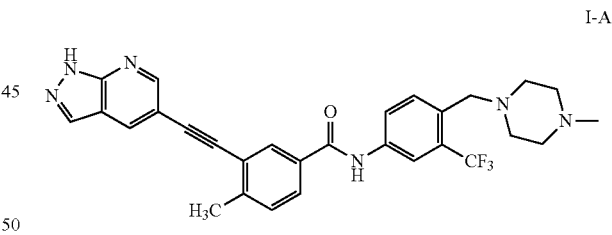

or a pharmaceutically acceptable salt thereof.

In certain embodiments, the compound of formula (I) or formula (I-A) is administered once every other day in an amount of about 1 mg, about 2 mg, about 4 mg, or about 8 mg.

In certain embodiments, the compound of formula (I) or formula (I-A) is administered once every other day in an amount of about 12 mg or about 20 mg.

In certain embodiments, the compound of formula (I) or formula (I-A) is administered once every other day in an amount of about 30 mg, about 40 mg, or about 45 mg.

In certain embodiments, the compound of formula (I) or formula (I-A) is administered once every other day in an amount of about 50 mg or about 60 mg.

In certain embodiments, the present invention relates to a method of inhibiting BCR-ABL mutants, comprising contacting a compound of formula (I) or a salt thereof with BCR-ABL mutants, wherein the BCR-ABL mutants is T315I, E255K/V, G250E, H396P, M351T, Q252H, Y253F/H, or BCR-ABL$^{WT}$.

In certain embodiments, the present invention relates to a method of inhibiting BCR-ABL mutants, comprising contacting a compound of formula (I) or a salt thereof with BCR-ABL mutants selected from T315I.

In certain embodiments, the present invention provides a medicament or pharmaceutical composition comprising the compound of formula (I) or formula (I-A) or pharmaceutically acceptable salt thereof for treat hematological malignancy, including chronic myelogenous leukemia.

In certain embodiments, the present invention relates to us of a compound of formula (I) or (I-A), or pharmaceutically acceptable salt thereof in the manufacture of medicament for the treatment of hematological malignancy, including chronic myelogenous leukemia.

DETAILED DESCRIPTION OF THE INVENTION

Figure 1A:
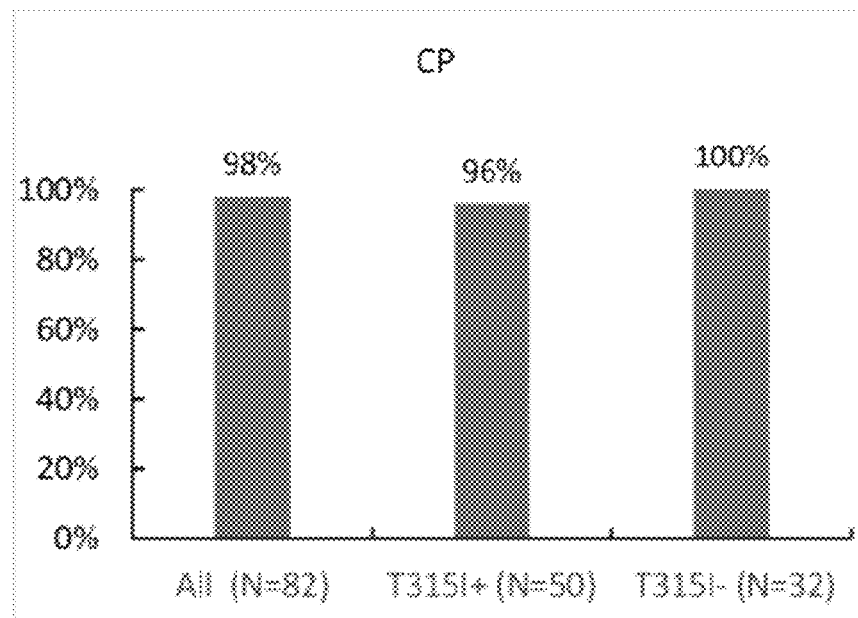
FIGS. 1A and 1B illustrate efficacy (CHR n %) of the compound of formula (I-A) in a phase 1 study.

All published documents cited herein are hereby incorporated herein by reference in their entirety.

Unless defined otherwise, all technical and scientific terms used herein have the same meaning as commonly understood by one of ordinary skill in the art to which this disclosure belongs.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%.

The term "comprises" refers to "includes, but is not limited to."

As used herein, the terms "treatment," "treat," and "treating" refer to reversing, alleviating, delaying the onset of, or inhibiting the progress of a disease or disorder, or one or more symptoms thereof, including but not limited to therapeutic benefit. In some embodiments, treatment is administered after one or more symptoms have developed. In some embodiments, treatment may be administered in the absence of symptoms. For example, treatment may be administered to a subject prior to the onset of symptoms (e.g., in light of a history of symptoms and/or in light of genetic or other susceptibility factors). Treatment may also be continued after symptoms have resolved, for example to prevent or delay their recurrence.

Therapeutic benefit includes eradication and/or amelioration of the underlying disorder being treated such as cancer; it also includes the eradication and/or amelioration of one or more of the symptoms associated with the underlying disorder such that an improvement is observed in the subject, notwithstanding that the subject may still be afflicted with the underlying disorder. In some embodiments, "treatment" or "treating" includes one or more of the following: (a) inhibiting the disorder (for example, decreasing one or more symptoms resulting from the disorder, and/or diminishing the extent of the disorder); (b) slowing or arresting the development of one or more symptoms associated with the disorder (for example, stabilizing the disorder and/or delaying the worsening or progression of the disorder); and/or (c) relieving the disorder (for example, causing the regression of clinical symptoms, ameliorating the disorder, delaying the progression of the disorder, and/or increasing quality of life.)

As used herein, "administering" or "administration" of the compound of formula (I) or formula (I-A) or a pharmaceutically acceptable salt thereof encompasses the delivery to a patient a compound or a pharmaceutically acceptable salt thereof, or a prodrug or other pharmaceutically acceptable derivative thereof, using any suitable formulation or route of administration, e.g., as described herein.

As used herein, the term "therapeutically effective amount" or "effective amount" refers to an amount that is effective to elicit the desired biological or medical response, including the amount of a compound that, when administered to a subject for treating a disorder, is sufficient to effect such treatment of the disorder. The effective amount will vary depending on the disorder, and its severity, and the age, weight, etc. of the subject to be treated. The effective amount may be in one or more doses (for example, a single dose or multiple doses may be required to achieve the desired treatment endpoint). An effective amount may be considered to be given in an effective amount if, in conjunction with one or more other agents, a desirable or beneficial result may be or is achieved. Suitable doses of any co-administered compounds may optionally be lowered due to the combined action, additive or synergistic, of the compound.

As used herein, "delaying" development of a disorder mean to defer, hinder, slow, stabilize, and/or postpone development of the disorder. Delay can be of varying lengths of time, depending on the history of the disease and/or the individual being treated.

As used herein, "patient" to which administration is contemplated includes, but is not limited to, humans (i.e., a male or female of any age group, e.g., a pediatric subject (e.g., infant, child, adolescent) or adult subject (e.g., young adult, middle-aged adult or senior adult)) and/or other primates (e.g., cynomolgus monkeys, rhesus monkeys).

As used herein, "pharmaceutically acceptable" or "physiologically acceptable" refer to compounds, salts, compositions, dosage forms and other materials which are useful in preparing a pharmaceutical composition that is suitable for veterinary or human pharmaceutical use.

As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, S. M. Berge et al., describe pharmaceutically acceptable salts in detail in *J. Pharmaceutical Sciences*, 1977, 66, 1-19. Pharmaceutically acceptable salts of Compound 1 include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, pivalate, propionate, stearate, succinate, sulfate, tartrate, thiocyanate, p-toluenesulfonate, undecanoate, valerate salts, and the like. Although pharmaceutically acceptable counter ions will be preferred for preparing pharmaceutical formulations, other anions are quite acceptable as synthetic intermediates. Thus it may be pharmaceutically undesirable anions, such as iodide, oxalate, trifluoromethanesulfonate and the like, when such salts are chemical intermediates.

As used herein, alkyl refers to methyl, ethyl, n-propyl, isopropyl, n-butyl, sec-butyl, isobutyl, or tert-butyl. Alkyl groups can be substituted or unsubstituted.

As used herein, cycloalkyl refers to cyclopropyl, cyclobutyl, cyclopentyl or cyclohexyl. Cycloalkyl groups can be substituted or unsubstituted.

As used herein alkoxy refers to methoxy, ethoxy, propoxy, isopropoxy butoxy, isobutoxy, sec-butoxy, or tert-butoxy. Alkoxy groups can be substituted or unsubstituted.

As used herein, halogen refers to fluorine, chlorine, bromine or iodine.

As used herein, compound of formula (I) has the following structure:

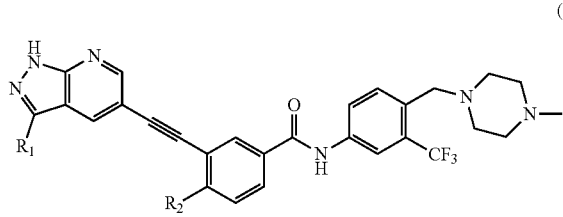

(I)

wherein $R_1$ is hydrogen, $C_{1-4}$ alkyl, $C_{3-6}$ cycloalkyl, $C_{1-4}$ alkyloxy, or phenyl; and $R_2$ is hydrogen, $C_{1-4}$ alkyl, $C_{3-6}$ cycloalkyl, or halogen.

As used herein, the compound of formula (I-A) has the following structure:

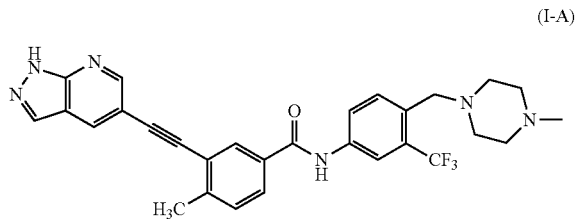 [SMILES: Cc1ccc(C(=O)Nc2ccc(CN3CCN(C)CC3)c(C(F)(F)F)c2)cc1C#Cc1cnc2[nH]ncc2c1]

(I-A)

The chemical name for the compound of (I-A) is 3-(2-(1H-pyrazolo[3,4-b]pyridin-5-yl)ethynyl)-4-methyl-N-(4-((4-methylpiperazin-1-yl)methyl)-3-(trifluoromethyl)phenyl)-benzamide.

As used herein, the compounds of formula (I) or (I-A) include any tautomer forms. As a non-limiting example, tautomerization may occur in the pyrazole and pyrimidine groups.

The compounds of formula (I) or formula (I-A) or a pharmaceutically acceptable salt thereof can be obtained according to the production methods described in U.S. Pat. No. 8,846,671 B2, issued Sep. 30, 2014, which is incorporated herein by reference in its entirety and for all purposes, or a method analogous thereto.

The compounds of formula (I) or (I-A) are novel, selective potent inhibitors against a broad spectrum of BCR-ABL mutations, including T315I, E255K/V, G250E, H396P, M351T, Q252H, Y253F/H, or BCR-ABL$^{WT}$.

The compounds of formula (I) or formula (I-A) or a pharmaceutically acceptable salt thereof are also potent inhibitors against other kinases including KIT, BRAF, DDR1, PDGFR, FGFR, FLT3, RET, SRC, TIE1, and TIE2.

Also provided herein are pharmaceutical compositions and dosage forms, comprising compounds of formula (I) or formula (I-A) or a pharmaceutically acceptable salt thereof, and one or more pharmaceutically acceptable excipients. Compositions and dosage forms provided herein may further comprise one or more additional active ingredients. Compounds of formula (I) or formula (I-A) or a pharmaceutically acceptable salt thereof may be administered as part of a pharmaceutical composition as described.

In some embodiment, provided is a method for hematological malignancy in a patient, comprising administering to the patient a therapeutically effective amount of a compound of formula (I):

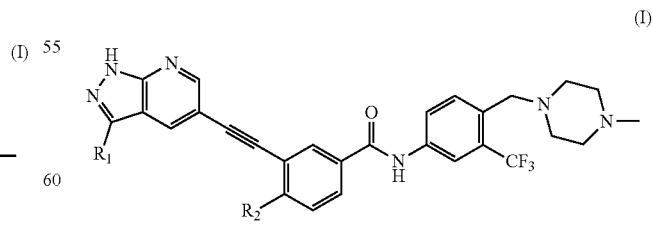

(I)

or a pharmaceutically acceptable salt thereof, wherein $R_1$ is hydrogen, $C_{1-4}$ alkyl, $C_{3-6}$ cycloalkyl, $C_{1-4}$ alkyloxy, or phenyl; and $R_2$ is hydrogen, $C_{1-4}$ alkyl, $C_{3-6}$ cycloalkyl, or halogen.

In certain embodiments, the compound of formula (I) is a compound of formula (I-A):

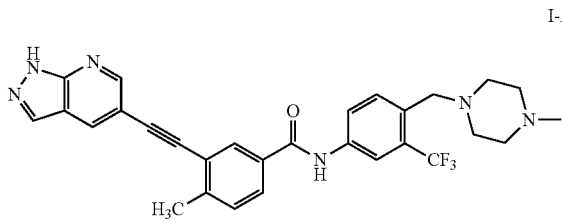

I-A or a pharmaceutically acceptable salt thereof.

In certain embodiments, the hematological malignancy is leukemia, including chronic myelogenous leukemia.

In certain embodiments, the method is in the treatment of the patient with chronic myeloid leukemia resistant to current tyrosine kinase inhibitor therapies, wherein resistant to the current tyrosine kinase inhibitor therapies is caused by BCR-ABL mutations.

Examples of the current tyrosine kinase inhibitors include, but not limit to, imatinib, dasatinib, nilotinib, bosutinib, ponatinib, or bafetinib, In certain embodiments, BCR-ABL mutation is T315I, E255K/V, G250E, H396P, M351T, Q252H, Y253F/H, or BCR-ABL$^{WT}$ mutations.

In certain embodiments, BCR-ABL mutation is T315I mutation.

In a more preferred embodiment of the invention, the method of the invention relates to a method for treating a hematological malignancy resistant to Ponatinib.

Ponatinib is a third-generation inhibitor of BCR-ABL for the treatment of Chronic Myelogenous Leukemia (CML) carrying the T315I mutation, Ph+ALL (Philadelphia chromosome positive ALL), and CML and Ph+ALL that are not responsive to other Tyrosine Kinase Inhibitors (TKIs). Although Ponatinib is clinically active against most BCR-ABL single mutations, a part of patients still do not respond consistently to Ponatinib (see: Cortes J E et al. A phase 2 trial of ponatinib in Philadelphia chromosome-positive leukemias. N Engl J Med. 2013; 369(19):1783-96). Studies have shown that the compound mutation of BCR-ABL may be involved in clinical drug resistance of CML and Ph+ALL to Ponatinib. For example, in Ph+ALL, the E255V/T315I double mutation can produce 20-fold resistance compared to the T315I single mutation, and other compound mutations such as Q252H/T315I, T315I/M351I and T315I/F359V are also less sensitive to Ponatinib (see: Zabriskie M S, et al. BCR-ABL1 compound mutations combining key kinase domain positions confer clinical resistance to ponatinib in Ph chromosome-positive leukemia. Cancer Cell. 2014; 26 (3): 428-42). In CML, patients containing both T315I and other mutations are more resistant than patients with single mutation T315I (see: Parker W T et al. The impact of multiple low-level BCR-ABL1 mutations on response to ponatinib. Blood. 2016; 127(15):1870-80).

In a preferred embodiment of the invention, the inhibitory effect of the compound of formula (I) and Ponatinib on BCR-ABL complex mutant cell proliferation is confirmed by constructing a stably transfected cell line with BCR-ABL complex mutation, and a potential therapeutic approach to overcome Ponatinib resistance is provided.

The invention proves that the compound of the formula (I-A) has better antiproliferative effect than Ponatinib on Ba/F3 cells with complex mutations of BCR-ABL$^{E255V/T315I}$, BCR-ABL$^{Y253H/E255V}$, BCR-ABL$^{T315M}$, BCR-ABL$^{Y253H/T315I}$, BCR-ABL$^{Y253H/F359V}$ and BCR-ABL$^{T315I/F317L}$. The results suggest that the compound of formula (I-A) is a potential candidate drug for overcoming the resistance of Ponatinib caused by BCR-ABL complex mutation.

In certain embodiments, the compound of formula (I), or pharmaceutically acceptable salt thereof is administered orally to the patients in need such treatment.

In certain embodiments, the compound of formula (I), or pharmaceutically acceptable salt thereof is administered once every one, two, or three days during the treatment cycle. The said treatment cycle may be 20-40 days, preferably 25-35 days, more preferably 28-day treatment cycle.

In certain embodiments, the compound of formula (I) or formula (I-A) is administered every day, or once every other day (QOD), or once every three days, particularly once every other day. The amount of administration is from 0.5 mg to 100 mg, preferably from 1 mg to 80 mg, more preferably from 1 mg to 60 mg. In the most preferable embodiments, it is in an amount of about 1 mg, 2 mg, 4 mg, 6 mg, 8 mg, 10 mg, 12 mg, 14 mg, 16 mg, 18 mg, 20 mg, 22 mg, 24 mg, 26 mg, 28 mg, 30 mg, 32 mg, 34 mg, 36 mg, 38 mg, 40 mg, 42 mg, 44 mg, 46 mg, 48 mg, 50 mg, 52 mg, 54 mg, 56 mg, 58 mg, or 60 mg.

In certain embodiments, the compound of formula (I) or formula (I-A) is administered once every other day in an amount of about 30 mg, about 40 mg, or about 45 mg.

In certain embodiments, the compound of formula (I) or formula (I-A) is administered once every other day in an amount of about 50 mg or about 60 mg.

In certain embodiments, the compound of formula (I) or formula (I-A) is formulated into a dosage unit to be administered every day, or once every other day (QOD), or once every three days, particularly once every other day. The amount of the dosage unit is from 0.5 mg to 100 mg, preferably from 1 mg to 80 mg, more preferably from 1 mg to 60 mg.

In certain embodiments, the present invention relates to a method of inhibiting BCR-ABL mutants, comprising contacting a compound of formula (I) or a salt thereof with BCR-ABL mutants, wherein the BCR-ABL mutants is T315I, E255K/V, G250E, H396P, M351T, Q252H, Y253F/H, or BCR-ABL$^{WT}$.

In certain embodiments, the present invention relates to a method of inhibiting BCR-ABL mutants, comprising contacting a compound of formula (I) or a salt thereof with BCR-ABL mutants selected from T315I.

In certain embodiments, the inhibition is in vitro or in vivo.

In certain embodiments, the inhibition is in a patient with chronic myeloid leukemia resistant to current tyrosine kinase inhibitor therapies.

In certain embodiments, the present invention provides a medicament or pharmaceutical composition comprising the compound of formula (I) or formula (I-A) or pharmaceutically acceptable salt thereof for treat hematological malignancy, including chronic myelogenous leukemia.

In certain embodiments, the present invention relates to the use of a compound of formula (I) or (I-A), or pharmaceutically acceptable salt thereof in the manufacture of medicament for the treatment of hematological malignancy, including chronic myelogenous leukemia.

In certain embodiments, the compound of formula (I) or (I-A) is in a solid dosage form.

In certain embodiments, the cancer is newly diagnosed.

In certain embodiments, the cancer is relapsed.

In certain embodiments, the cancer is refractory.

The present disclosure describes various embodiments. A person of ordinary skill in the art reviewing the disclosure will readily recognize that various embodiments can be combined in any variation. For example, embodiments of the disclosure include treatment of various disorders, patient populations, administrations of dosage forms, at various dosages, minimization of various adverse events, and improvements in various efficacy measures, etc. Any combinations of various embodiments are within the scope of the disclosure.

As used herein, the term "survival" refers to the patient remaining alive, and includes progression-free survival (PFS) and overall survival (OS). Survival can be estimated by the Kaplan-Meier method, and any differences in survival are computed using the stratified log-rank test.

As used herein, the term "progression-free survival (PFS)" refers to the time from treatment (or randomization) to first disease progression or death. For example it is the time that the patient remains alive, without return of the cancer (e.g., for a defined period of time such as about one month, two months, three months, three and a half months, four months, five months, six months, seven months, eight months, nine months, about one year, about two years, about three years, about five years, about 10 years, about 15 years, about 20 years, about 25 years, etc.) from initiation of treatment or from initial diagnosis. Progression-free survival can be assessed by Response Evaluation Criteria in Solid Tumors (RECIST).

The term "overall survival" refers to the patient remaining alive for a defined period of time (such as about one year, about two years, about three years, about four years, about five years, about 10 years, about 15 years, about 20 years, about 25 years, etc.) from initiation of treatment or from initial diagnosis.

Non-limiting examples of hematologic malignancies also include amyloidosis, acute myeloid leukemia (AML); chronic myelogenous leukemia (CML) including accelerated CML and CML blast phase (CML-BP); acute lymphoblastic leukemia (ALL); chronic lymphocytic leukemia (CLL); Hodgkin's disease (HD); non-Hodgkin's lymphoma (NHL), including follicular lymphoma and mantle cell lymphoma; B-cell lymphoma; T-cell lymphoma; multiple myeloma (MM); Waldenstrom's macroglobulinemia; myelodysplastic syndromes (MDS), refractory anemia (RA), refractory anemia with ringed sideroblasts (RARS), refractory anemia with excess blasts (RAEB), and RAEB in transformation (RAEB-T); and myeloproliferative syndromes.

For cancer therapy, efficacy may be measured by assessing the duration of survival, duration of progression-free survival (PFS), the response rates (RR) to treatments, duration of response, and/or quality of life.

The term "pharmaceutically acceptable carrier" is used herein to refer to a material that is compatible with a recipient subject, preferably a mammal, more preferably a human, and is suitable for delivering an active agent to the target site without terminating the activity of the agent. The toxicity or adverse effects, if any, associated with the carrier preferably are commensurate with a reasonable risk/benefit ratio for the intended use of the active agent.

The pharmaceutical compositions of this disclosure can be manufactured by methods well known in the art such as conventional granulating, mixing, dissolving, encapsulating, lyophilizing, or emulsifying processes, among others. Compositions may be produced in various forms, including granules, precipitates, particulates, or powders.

The term "orally" refers to administering a composition that is intended to be ingested. Examples of oral forms include, but are not limited to, tablets, pills, capsules, powders, granules, solutions or suspensions, and drops. Such forms may be swallowed whole or may be in chewable form.

Solid dosage forms for oral administration include capsules, tablets, pills, powders, and granules. In such solid dosage forms, the active ingredient is mixed with at least one inert, pharmaceutically acceptable excipient or carrier such as sodium citrate or dicalcium phosphate and/or a) fillers or extenders such as starches, lactose, sucrose, glucose, mannitol, and silicic acid; b) binders such as, for example, carboxymethylcellulose, alginates, gelatin, polyvinylpyrrolidinone, sucrose, and acacia; c) humectants such as glycerol; d) disintegrating agents such as agar-agar, calcium carbonate, potato or tapioca starch, alginic acid, certain silicates, and sodium carbonate; e) solution retarding agents such as paraffin; f) absorption accelerators such as quaternary ammonium compounds; g) wetting agents such as, for example, cetyl alcohol and glycerol monostearate; h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also comprise buffering agents such as phosphates or carbonates.

Solid compositions may also be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the pharmaceutical formulating art. They may optionally contain opacifying agents and can also be of a composition such that they release the active ingredient(s) only, or preferentially, in a certain part of the intestinal tract, optionally, in a delayed manner. Examples of embedding compositions that can be used include polymeric substances and waxes.

In solid dosage forms the active ingredients may be mixed with at least one inert diluent such as sucrose, lactose or starch. Such dosage forms may also comprise, as is normal practice, additional substances other than inert diluents, e.g., tableting lubricants and other tableting aids such a magnesium stearate and microcrystalline cellulose. In the case of capsules, tablets and pills, the dosage forms may also comprise buffering agents.

The active ingredients can also be in micro-encapsulated form with one or more excipients as noted above.

EXAMPLES

Example 1

A single-agent, open-label dose escalation and dose expansion Phase I study to assess the safety, preliminary efficacy, pharmacokinetic (PK) and pharmacodynamic (PD) properties of orally administered the compound of formula (I-A) in the TKI-resistant patients with chronic phase (CP) or accelerated phase (AP) CML.

Methods: the compound of formula (I-A) was administered orally once every other day (QOD) in 28-days cycles at 11 dose cohorts ranging from 1 mg to 60 mg. The eligible patients received treatments until disease progression or intolerable toxicities. The primary efficacy endpoint in the CML AP and CP patients, was complete hematological response (CHR) and major cytogenetic response (MCyR) respectively, MCyR includes partial cytogenetic response (PCyR) and complete cytogenetic response (CCyR). Blood samples were collected at various time points on Day 1-2 and Day 27-28 during cycle 1 for PK analyses. BCR-ABL inhibition was evaluated using tyrosine phosphorylation of CRKL and STAT5 in peripheral blood mononuclear cell (PBMCs) collected from the patients before and 4, 8, 24 and 48 hours post the compound of formula (I-A) treatments on Day 1, 15 and 27 during cycle 1.

Dose Escalation:
- 3 to 6 subjects in each dose group (traditional 3+3 dose increasing method)
- Up to 15 subjects in the MTD dose group (safety and PK characteristics)
- Dose extension studies:
- Up to 60 subjects (CP/CML-AP)
- Extended dose selection is based on initial safety and efficacy Study Endpoints Primary Endpoint To determine the safety and RP2D (recommended phase 2 dose) of the compound of formula (I-A) in patients with resistant/refractory CML Secondary Endpoints
- To examined the safety of the compound of formula (I-A) in resistant/refractory CML patients.
- To evaluate the pharmacokinetic characteristics of the compound of formula (I-A)
- To evaluate the efficacy of the compound of formula (I-A) in resistant/refractory CML patients.

In certain embodiments, patients who meet the following criteria may receive the treatments:
- Patients>18 years in CP or AP.
- TKI resistance.
- ECOG≥2.
- Minimum life expectancy of ≥3 months.
- Patients with adequate organ function.
- Heart function: Left ventricular ejection fraction (LVEF) >50%.
- EKG QTc interval: male≤450 ms, female≤470 ms.
- Agree to use effective form of contraception (as applicable).
- Ability to comply with study procedures, in the Investigator's opinion.

In certain embodiments, patients who has the following criteria may exclude from the treatments:
- The patients who received cytotoxic chemotherapy, or any other radiotherapy within 28 days; or interferon, cytarabine within 14 days; or other TKIs within 14 days; or any adverse events (AEs) not recovered to CTCAE grade 0-1 due to any other treatments (except alopecia).
- Patients who are currently receiving treatment with a medication that has the potential to interact with the compound of formula (I-A).
- Patients who had been treated with ponatinib, or the compound of formula (I-A) like drugs.
- Impairment of gastrointestinal (GI) function or GI disease that may significantly alter absorption of study drugs.
- Patients with cardiovascular diseases, including HBP (>140/90 mmHg); or receiving drugs that can cause prolonged QT interval.
- Mean pulmonary artery pressure >25 mmHg.
- Having experience of serious cardiovascular AEs during previous TKI treatment.
- Patients having history of HSCT.
- Patients having abnormal coagulation function or having a significant bleeding disorder unrelated to CML.
- Patients who have a major surgery within 4 weeks prior to study entry.
- Patients who have a history of bleeding disease unrelated to CML.
- Patients who require immunosuppressive therapy other than short time of steroid.
- Cytologically confirmed central nervous system (CNS) involvement (if asymptomatic, spinal fluid examination is not necessary prior to first treatment).
- Patients with the medical history of clinically significant primary malignancy concurrently clinically significant primary malignancy.
- Have ongoing or active infection, including HIV+, Hepatitis A, B, or C.
- Known allergy to any components in the study drug.
- Pregnant or lactating.

Patients' Characteristics

|  | Total | CP | AP |
|---|---|---|---|
| Age, median (range) | 40 (20-64) | 39 (20-64) | 40 (20-64) |
| Male, n (%) | 70 (70%) | 58 (67%) | 12 (86%) |
| ECOG, n (%) | | | |
| 0 | 84 (84%) | 71 (83%) | 13 (93%) |
| 1 | 16 (16%) | 15 (17%) | 1 (7%) |
| Interval Dx to the compound of formula (I-A), median (range) | 6 (0.3-15.2) | 5 (0.6-15.2) | 8 (0.3-14.7) |
| Prior TKI-therapy, n (%) | | | |
| 1 | 17 (17%) | 12 (14%) | 5 (36%) |
| 2 | 51 (51%) | 47 (55%) | 4 (29%) |
| ≥3 | 32 (32%) | 27 (31%) | 5 (36%) |

TKI type

|  | Total | CP | AP |
|---|---|---|---|
| Imatinib or Nilotinib | 12 (12%) | 12 (14%) | 1 (36%) |
| Imatinib + Dasatinib | 32 (32%) | 30 (35%) | 2 (14%) |
| Imatinib + Nilotinib | 17 (17%) | 15 (17%) | 2 (14%) |
| Imatinib + Dasatinib + Nilotinib | 5 (5%) | 27(31%) | 5 (36%) |

BCR-ABL Mutation Status at Baseline

|  | Total | CP | AP |
|---|---|---|---|
| No mutation, n (%) | 23(23%) | 22 (26%) | 1 (7%) |
| Mutation(s) n (%) | | | |
| 1 | 17 (17%) | 12 (14%) | 5 (36%) |
| 2 | 51 (51%) | 47 (55%) | 4 (29%) |
| ≥3 | 14 (14%) | 10 (12%) | 4 (29%) |
| Type | | | |
| T315I | 13 (63%) | 52 (60%) | 11 (19%) |
| F317L | 11 (11%) | 9 (10%) | 2 (14%) |
| E255K | 7 (7%) | 5 (6%) | 2 (14%) |
| 359I/V | 3 (3%) | 2 (2%) | 1 (7%) |
| 244V | 4 (4%) | 3 (3%) | 1 (7%) |
| G250E | 3 (3%) | 3 (3%) | 0 (%) |
| E459K | 2 (2%) | 2 (2%) | 0 (%) |
| Y253F/H | 2 (2%) | 2 (2%) | 0 (%) |
| Others: | 10 (10%) | 10 (38) | 0 (%) |

Patent Disposition

| Patients-n | CP | AP | Total |
|---|---|---|---|
| Continuing on treatment, n(%) | 85(99%) | 10(71%) | 95(95%) |
| Not continuing on treatment, but continuing in study, n (%) | | | |
| PD/Failure | 0 | 4(29%) | 4(4%) |
| Others | 1(1%) | 0 | 1(1%) |

Treatment Related Adverse Events

|  | Treatment related Adverse events in 10% of patients | | |
|---|---|---|---|
|  | Any grade n (%) | Grade 3-4 n (%) | SAE n (%) |
| leukocytosis | 9 (9.0%) | 8 (8.0%) | 0 |
| Leukopenia | 17 (17%) | 15 (15%) | 0 |
| Neutropenia | 2 (2.0%) | 0 | 0 |
| Thrombocytopenia | 46 (46%) | 45 (45%) | 5 (5.0%) |
| Anaemia | 10 (10%) | 9 (9.0%) | 2 (2.0%) |
| Proteinuria | 11 (11%) | 1 (1.0%) | 0 |
| Hypertriglyceridaemia | 51 (51%) | 4 (4.0%) | 0 |
| Skin hyperpigmentation | 35 (35%) | 0 | 0 |
| Alanine aminotransferase increased | 29 (29%) | 2 (2.0%) | 0 |
| Aspartate aminotransferase inceased | 31 (31%) | 2 (2.0%) | 0 |
| Hypocalcaemia | 31 (31%) | 0 | 0 |
| Blood bilirubin increased | 28 (28%) | 1 (1.0%) | 0 |
| Blood creatine phosphokinase increased | 19 (19%) | 1 (1.0%) | 0 |

On Treatment Period

| Dose cohort | Number of patients | On-treatment duration median | range |
|---|---|---|---|
| 1 mg | 3 | 12.6 | 12.3-16.5 |
| 2 mg | 3 | 9.6 | 2.0-15.3 |
| 4 mg | 3 | 8.5 | 8.4-9.3 |
| 8 mg | 3 | 10.4 | 7.3-13.3 |
| 12 mg | 3 | 11.4 | 11.4-12.9 |
| 20 mg | 4 | 10.9 | 8.4-14.0 |
| 30 mg | 37 | 7.4 | 0.0-11.4 |
| 40 mg | 37 | 3.7 | 1.2-7.0 |
| 45 mg | 3 | 11.3 | 11.1-11.3 |
| 50 mg | 24 | 5.2 | 0.7-7.2 |
| 60 mg | 3 | 9.4 | 9.4-9.7 |

Treatment Related AEs Leading to Dose Interruption/Reduction by Dose

| AE | 20 mg (n = 4) n (%) | 30 mg (n = 37) n (%) | 40 mg (n = 37) n (%) | 45 mg (n = 3) n (%) | 50 mg (n = 24) n (%) | 60 mg (n = 3) n (%) |
|---|---|---|---|---|---|---|
| Thrombocytopenia | 1(25%) | 12 (32%) | 11 (30%) | 2(67%) | 8 (33%) | 2(67%) |
| Hypocalcemia | 0 | 2 (5.4%) | 0 | 0 | 1 (4.2%) | 0 |
| AST increased | 0 | 0 | 1 (2.7%) | 0 | 1 (4.2%) | 0 |
| ALT increased | 0 | 0 | 1 (2.7%) | 0 | 1 (4.2%) | 0 |
| Lipase increased | 0 | 0 | 1 (2.7%) | 0 | 1 (4.2%) | 0 |
| Amylase increased | 1(25%) | 0 | 0 | 0 | 0 | 0 |
| Anemia | 0 | 1 (2.7%) | 0 | 0 | 0 | 0 |
| Atrial fibrillation | 0 | 1 (2.7%) | 0 | 0 | 0 | 0 |
| Cardiomyopathy | 0 | 0 | 0 | 0 | 0 | 1(33%) |
| GGT increased | 0 | 0 | 1 (2.7%) | 0 | 0 | 0 |
| Hyperkalemia | 0 | 1 (2.7%) | 0 | 0 | 0 | 0 |
| Hypertriglyceridemia | 0 | 1 (2.7%) | 0 | 0 | 0 | 0 |
| Lacunar infarction | 0 | 0 | 0 | 0 | 1 (4.2%) | 0 |

Safety Profile and Response Rates

TABLE 1

Safety Profile (Incidence Rate ≥5%)

| TRAEs | Any grade n (%) | Grade 3-4, n (%) |
|---|---|---|
| Overall | 67 (96%) | 44 (63%) |
| Hematological | 36 (51%) | 36 (51%) |
| Thrombocytopenia | 35 (50%) | 35 (50%) |
| Leucocytopenia | 12 (17%) | 12 (17%) |
| Anaemia | 6 (8.6%) | 5 (7.1%) |
| Non-hematological | 67 (96%) | 11 (16%) |
| Skin hyperpigmentation | 17 (24%) | 0 |
| Pyrexia | 13 (19%) | 4 (5.7%) |
| Myalgia | 11 (16%) | 0 |
| Rash | 9 (13%) | 0 |
| Skin mass | 6 (8.6%) | 0 |
| Hypertriglyceridaemia | 36 (51%) | 2 (2.9%) |
| Hypocalcaemia | 25 (36%) | 0 |
| Hyperbilirubinemia | 20 (29%) | 0 |
| CPK increased | 18 (26%) | 1 (1.4%) |
| AST increased | 17 (24%) | 0 |
| ALT increased | 15 (21%) | 0 |
| Hypokalaemia | 12 (17%) | 0 |
| GGT increased | 10 (14%) | 0 |
| Hyperglycaemia | 5 (7.1%) | 0 |
| Hyponatraemia | 5 (7.1%) | 0 |
| Creatinine increased | 4 (5.7%) | 0 |

TABLE 2

Response Rates

| | All | T315I mutation | Without T315I mutation |
|---|---|---|---|
| Hematological response-n(%) | | | |
| Complete hematological response-n(%) | 65/70 (93%) | 40/45 (89%) | 25/25 (100%) |
| Cytogenetic response-n(%) | | | |
| Major cytogenetic response-n (%) | 24/47 (51%) | 17/29 (59%) | 7/18 (39%) |
| Complete cytogenetic response-n (%) | 14/47 (30%) | 13/29 (45%) | 1/18 (6%) |
| Molecular response | | | |
| Major molecular response-n (%) | 6/48 (13%) | 6/30 (20%) | 0/18 |

Results Analysis 70 patients (CP n=58 and AP n=12) enrolled received ≥1 cycle of the compound of formula (I-A) treatment, only 1 patient withdrew from the study due to disease progression. Median age was 39 (range: 23-59) years. Median interval from CML diagnosis to starting the compound of formula (I-A)-treatment was 6.1 (1.1-14.7) years. Sixty-one (87%) patients received ≥2 prior lines of TKI-therapy. Fifty-three (76%) patients had BCR-ABL mutations and 45 (64%) had T315I mutation at baseline.

With a median follow-up of 4.1 (1.0-21.2) cycles, the compound of formula (I-A) treatment was well-tolerated in all dose cohorts other than the 60 mg cohort. In all patients, 67 (96%) patients experienced ≥1 treatment related adverse events (TRAEs) and 44 (63%) experienced TRAE(s) of grade 3-4 (Table 1). There was no patient withdrawal from the study because of TRAEs. Two out of 3 patients in the 60 mg cohort experienced dose-limiting toxicity (DLT) and the compound of formula (I-A) treatment at 50 mg QOD was considered as maximum toxic dosage (MTD).

The anti-leukemic activities of the compound of formula (I-A) treatment were observed in this study. Sixty-five (93%) patients including 58 (100%) CP and 7 (58%) AP patients achieved CHR at the dose of 2 mg to 60 mg within 3 cycles. In 47 evaluable patients receiving the compound of formula (I-A)-treatment ≥3 cycles, 24 (51%) achieved MCyR including 21 (54%) CP and 3 (38%) AP patients at the dose of 12 mg to 50 mg, and 14 (30%) patients achieved CCyR including 12 (31%) CP and 2 (25%) AP patients. Total 6 (15%) CP patients achieved MMR. More than 65% of the patients achieved MCyR or MMR at the end of cycle The compound of formula (I-A) was highly active in patients with or without T315I mutation at baseline (Table 2).

Following oral administration of the compound of formula (I-A) treatment at doses ranging from 1 mg to 60 mg, the peak concentration was reached at 2-8 hrs. The elimination appeared to be linear with a mean terminal Tin of 15.3-36.5 hrs on Day 1, 18.8-42.5 hours on Day 27, respectively (the window period of the observation time is 48 hrs). The ratios for AUC0-t and Cmax of the compound of formula (I-A) treatment on Day 27 versus Day 1 ranged from 1.03 to 2.12 and from 0.78 to 1.93, respectively. Thus, the compound of formula (I-A) exhibited an approximately dose proportional increase in Cmax and AUC0-t following single or multiple oral administration dose ranging from 1 to 60 mg. PD study results demonstrated that reduction of CRKL phosphorylation was schedule and dose-dependent, ≥50% reduction was observed at doses ranging 12 mg-60 mg.

Figure 1B:
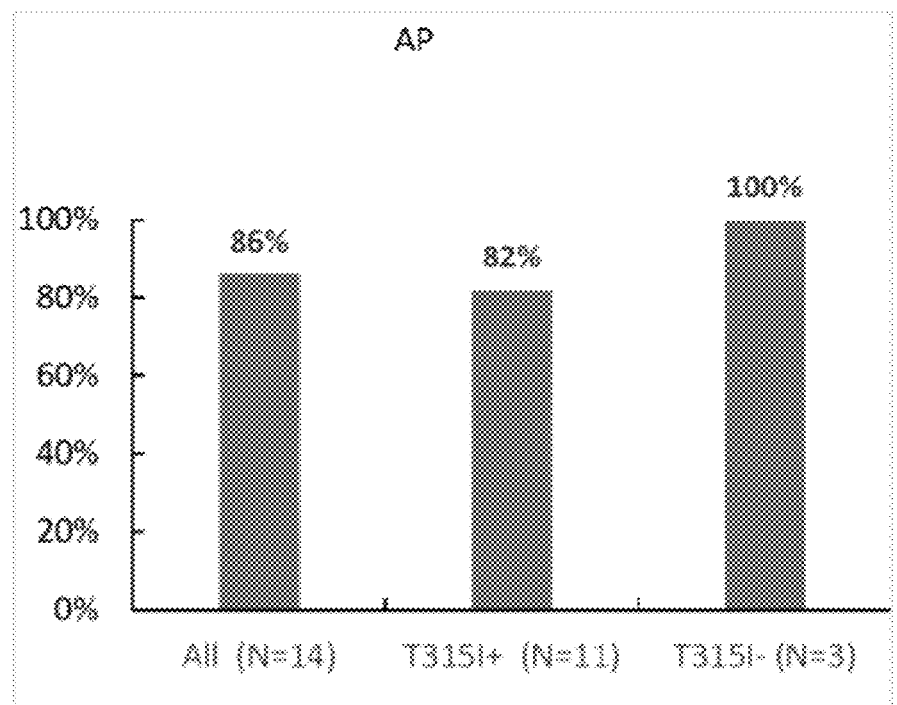

FIGS. 1A and 1B illustrate the efficacy (CHR n %) of the compound of formula (I-A) in a phase 1 study.

Wherein, FIG. 1A shows that 98% of the total 82 CML-CP patients achieved CHR, including 50 patients of T315I$^+$ (96% achieved CHR) and 32 patients of T315I$^-$ (100% achieved CHR).

FIG. 1B shows that 86% of the total 14 CML-AP patients achieved CHR, including 11 patients of T315I$^+$ (82% achieved CHR) and 3 patients of T315I$^-$ (100% achieved CHR).

Figure 2A:
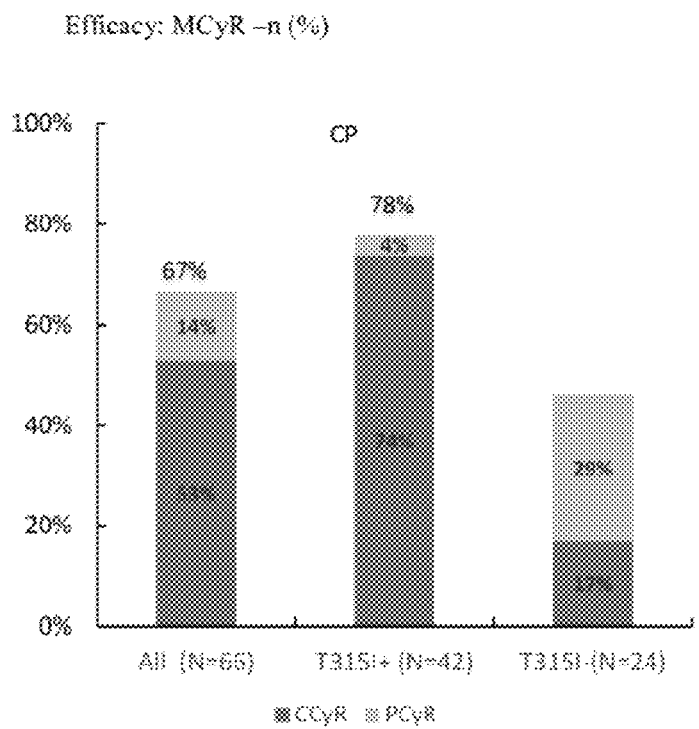
FIGS. 2A and 2B illustrate efficacy (MCyR n %) of the compound of formula (I-A) in a phase 1 study.
Figure 2B:
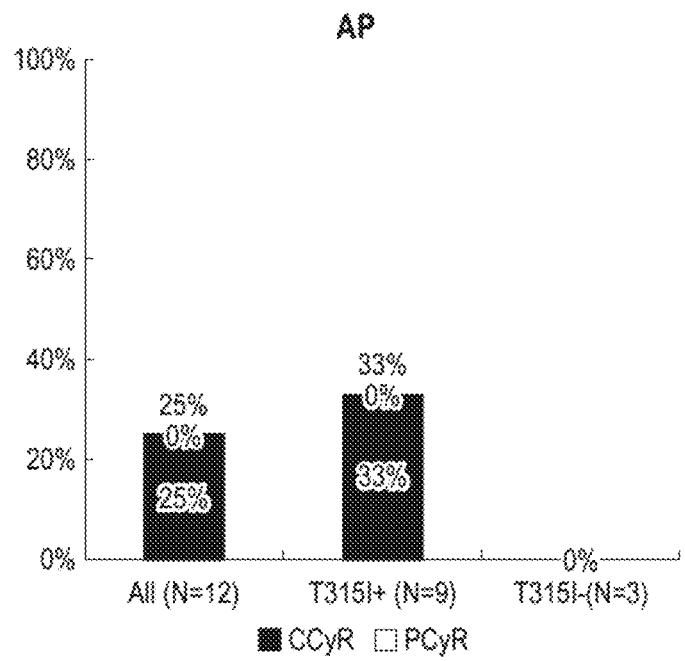

FIGS. 2A and 2B illustrate the efficacy (MCyR n %) of the compound of formula (I-A) in a phase 1 study.

Wherein, FIG. 2A shows that 67% of the total 66 CML-CP patients achieved MCyR, wherein 14% of them achieved PCyR, and 53% achieved CCyR. 78% of the 42 patients of T315I$^+$ achieved MCyR (of which 4% achieved PCyR, and 74% achieved CCyR); 46% of the 24 patients of T315I$^-$ achieved MCyRa (wherein 29% achieved PCyR, and 17% achieved CCyR).

FIG. 2B shows that 25% of the total 12 CML-AP patients achieved MCyR. Wherein, 33% of the 9 patients of T315I$^+$ achieved CCyR; 3 patients of T315I$^-$ had a response rate of 0.

Figure 3A:
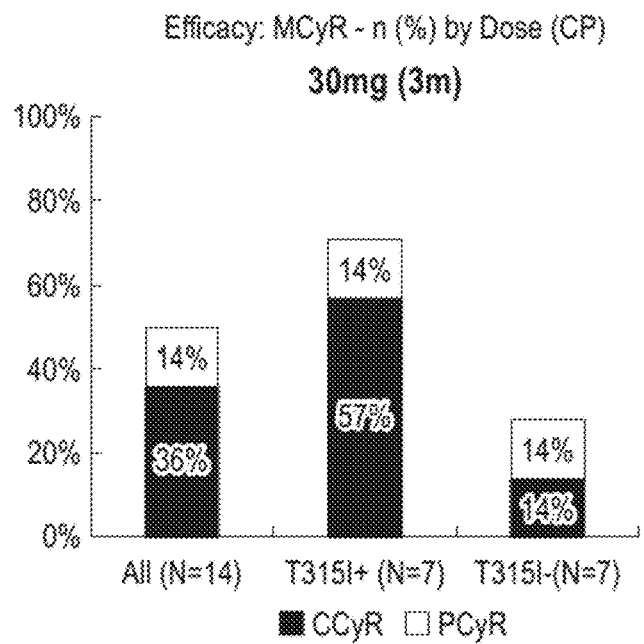
FIGS. 3A, 3B, and 3C illustrate efficacy (MCyR n %) by dose (CP) of the compound of formula (I-A) in a phase 1 study.
Figure 3B:
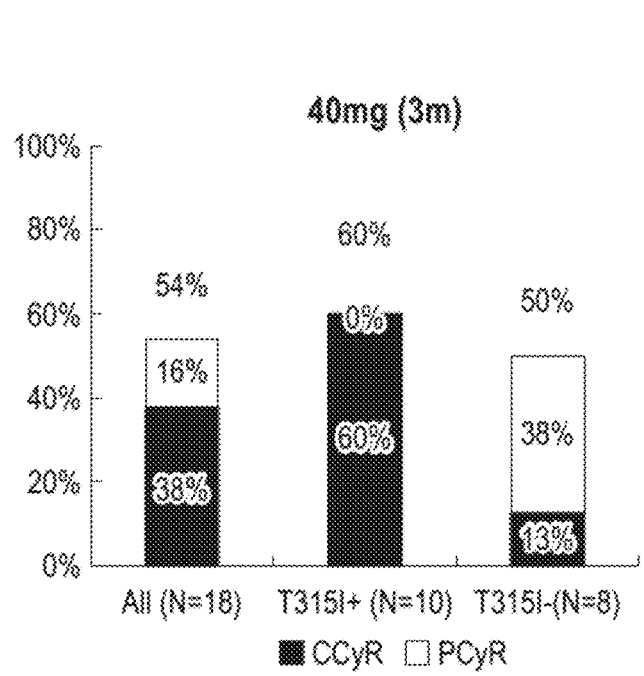
Figure 3C:
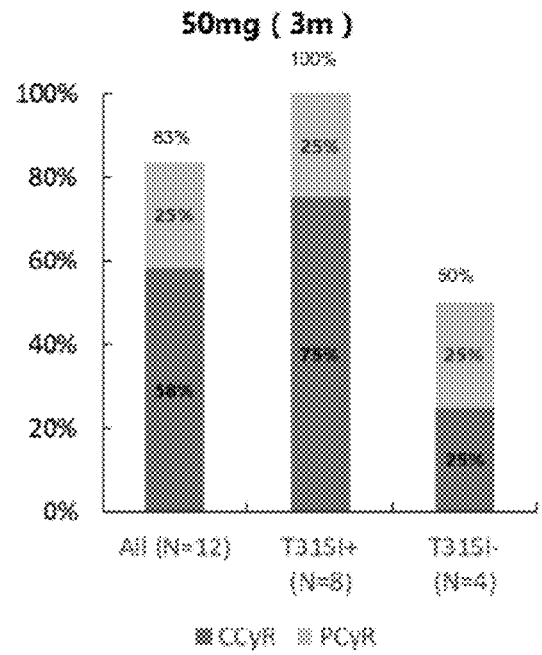

FIGS. 3A, 3B and 3C illustrate the efficacy (MCyR n %) of the compound of formula (I-A) with specific doses (CP) in a phase 1 study.

Wherein, FIG. 3A shows that, when a dose of 30 mg is administered, 50% of the total 14 CML-CP patients achieved MCyR (wherein 14% achieved PCyR and 36% achieved CCyR). Wherein 71% of the 7 patients of T315I$^+$ achieved MCyR (wherein 14% achieved PCyR and 57% achieved CCyR); 28% of the 7 patients of T315I⁻ achieved MCyR (wherein 14% achieved PCyR and 14% achieved CCyR).

FIG. 3B shows that, when a dose of 40 mg is administered, 54% of the total 18 CML-CP patients achieved MCyR (wherein 16% achieved PCyR and 38% achieved CCyR). Wherein 60% of the 10 patients of T315I⁺ achieved MCyR (all of the 60% achieved CCyR); 50% of the 8 patients of T315I⁻ achieved MCyR (wherein 38% achieved PCyR and 13% achieved CCyR).

FIG. 3C shows that, when a dose of 50 mg is administered, 83% of the total 12 CML-CP patients achieved MCyR (wherein 25% achieved PCyR and 58% achieved CCyR). Wherein 100% of the 8 patients of T315I⁺ achieved MCyR (of which 75% achieved CCyR, and 25% achieved PCyR); 50% of 4 the patients of T315I⁻ achieved MCyR (wherein 25% achieved PCyR and 25% achieved CCyR).

Figure 4A:
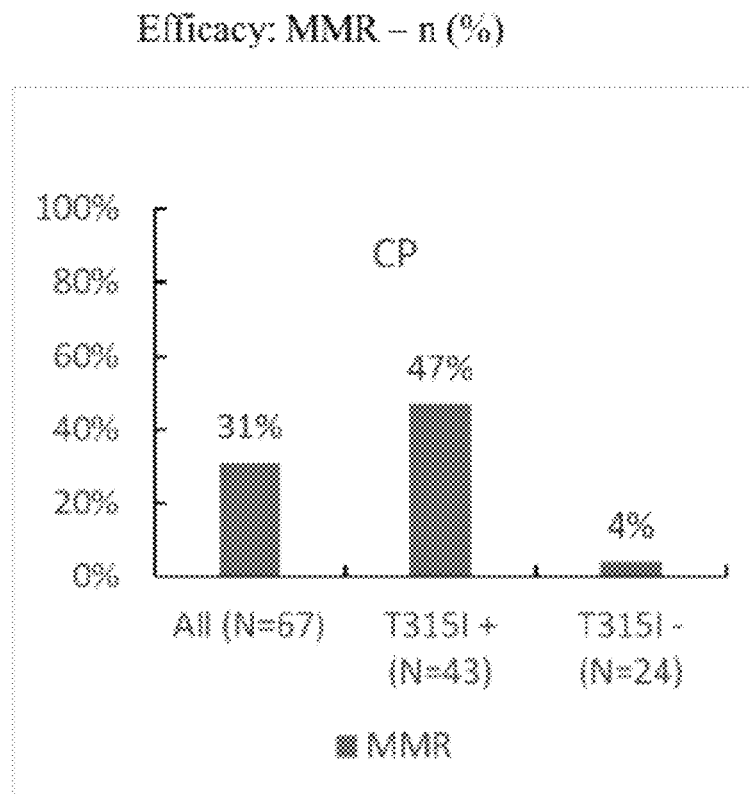
FIGS. 4A and 4B illustrate MMR (MCyR n %) of the compound of formula (I-A) in a phase 1 study.
Figure 4B:
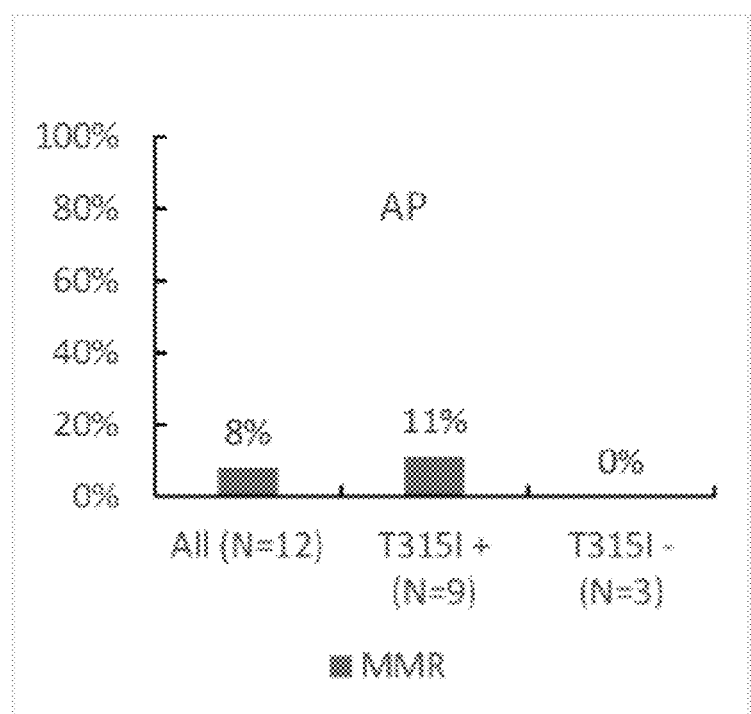

FIGS. 4A and 4B illustrate MMR (MCyR n %) of the compound of formula (I-A) in a phase 1 study.

Wherein FIG. 4A shows that 31% of the total 67 CML-CP patients achieved MMR, wherein 47% of the 43 patients of T315I⁺ achieved MMR; 4% of the 24 patients of T315I⁻ achieved MMR.

FIG. 4B shows that 8% of the total 12 CML-AP patients achieved MMR. Wherein, 11% of the 9 patients of T315I⁺ achieved MMR; 0% of the 3 patients of T315I⁻ achieved MMR.

Figure 5A:
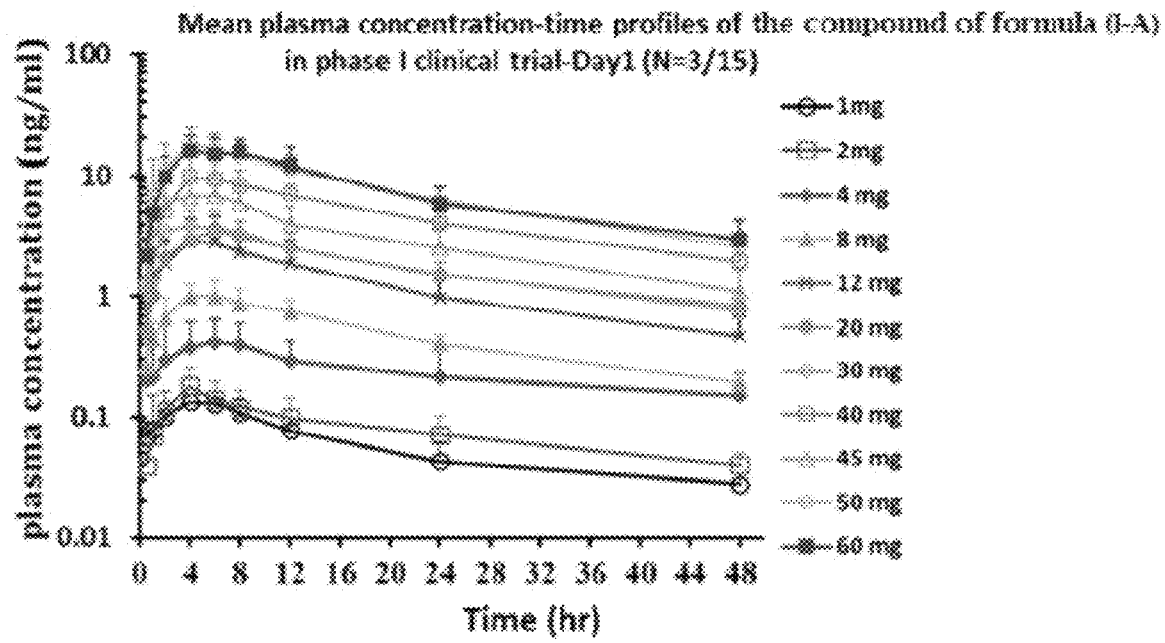
FIGS. 5A and 5B illustrate plasma concentration-time profiles of the compound of formula (I-A) in a phase 1 study.
Figure 5B:
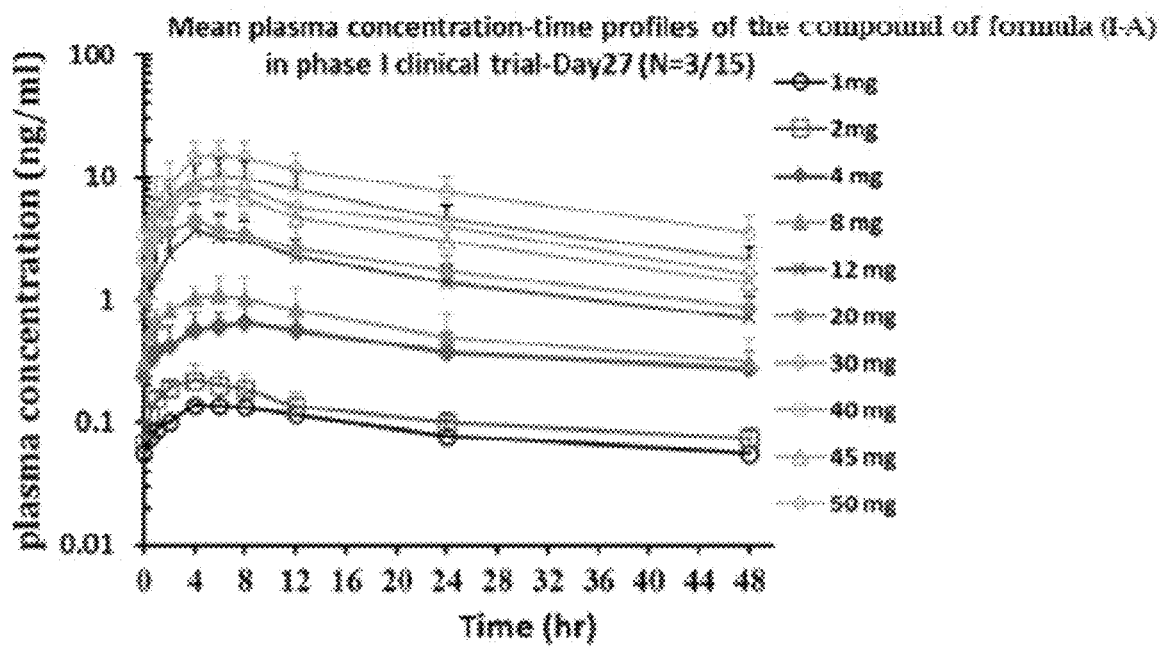

FIGS. 5A and 5B illustrate the plasma concentration-time profiles of the compound of formula (I-A) in a phase 1 study.

CONCLUSIONS

As shown in FIGS. 1-5 and Tables 1-2, the preliminary results of the phase 1 clinical study showed that the compound of formula (I-A), a novel $3^{rd}$-generation TKI, is safe and highly active in treatment of the TKI-resistant patients with CML-CP and CML-AP, with or without T315I mutation.

Example 2

Further Efficacy and Safety Results of Phase 1 Study of the compound of formula (I-A) in Patients with Resistant Chronic Myeloid Leukemia The compound of formula (I-A) is designed for treatment of patients with chronic myeloid leukemia (CML) resistant to current TKI-therapies including those with T315I mutation. This experiment is focus on the efficacy and safety assessment of the compound of formula (I-A) in a relatively long term.

Methods

An open-label, 3+3 dose escalation, phase 1 trial of the compound of formula (I-A) design to determine maximum tolerated dose (MTD) and identify dose-limiting toxicities (DLTs) in patients with chronic phase (CP/CML-CP) or accelerated phase (AP/CML-AP) CML resistant to or intolerant of ≥2 prior TKIs or patients with BCR-ABL T315I M after ≥1 prior TKI is ongoing. The compound of formula (I-A) was administered once every other day (QOD) in 28-day cycles at 11 dose cohorts ranging from 1 mg to 60 mg. The eligible patients received continuous treatment until disease progression or unacceptable toxicity, consent withdrawal, or death. The primary efficacy endpoints were major cytogenetic response (MCyR) for CP and complete hematological response (CHR) for AP. MCyR includes partial cytogenetic response (PCyR) and complete cytogenetic response (CCyR). Blood samples were collected at various time points on Day 1-2 and Day 27-28 during cycle 1 for PK analyses.

Results

Total 101 patients including 87 CML-CP and 14 CML-AP, wherein 71 (70.3%) are male patients, had received the compound of formula (I-A) as a single agent QOD doses. A total of 62 (61.4%) patients with T315I mutation were included. Median duration of follow-up was 11.2 m (range, 1.2-30.6 m). Median age was 40 years (range 20-64y). Median interval from CML diagnosis to starting the compound of formula (I-A) treatment was 5.83 years (range 0.3-15.2y). Most Patients (98%) had baseline ECOG status 0-1. Patients were heavily pretreated, 83 (83.8%) patients received ≥2 prior lines of TKI-therapy. Two out of 3 patients at 60 mg cohort experienced DLT, and 50 mg QOD was considered as MTD. After MTD determined, dose expansion was implemented in the dose levels of 30 mg, 40 mg and 50 mg QOD. A total of 56 patients were included in expansion part.

The compound of formula (I-A) was well-tolerated in all dose cohorts with an exception of 60 mg cohort. In all patients, 101 (100%) patients experienced ≥1 treatment related adverse events (TRAEs), the most frequent TRAEs were reported as grade 1 or grade 2. The most common grade ¾ TRAEs were hematological AEs, including thrombocytopenia (49.5%). The incidences of AEs tended to be dose-dependent. No death and no CTCAE grade 5 events have occurred on study. The incidence of common TRAEs (≥10%) are shown in Table 3.

TABLE 3

Summary tabulation: Treatment Related Adverse Events

| | The compound of formula (I-A) | | |
|---|---|---|---|
| | Any Grade | Grade 3, 4 | SAE |
| Treated Population Preferred Term, n(%) | 101 | 101 | 101 |
| Non-hematological AEs | | | |
| Skin pigmentation | 79 (78.2%) | 0 | 0 |
| Hypertriglyceridaemia | 55 (54.5%) | 8 (7.9%) | 0 |
| AST elevation | 37 (36.6%) | 3 (3.0%) | 0 |
| Proteinuria | 35 (34.7%) | 5 (5.0%) | 0 |
| ALT elevation | 34 (33.7%) | 2 (2.0%) | 0 |
| Bilirubin elevation | 34 (33.7%) | 1 (1.0%) | 0 |
| Hypocalcaemia | 34 (33.7%) | 0 | 0 |
| GGT elevation | 24 (23.8%) | 0 | 0 |
| Hyponatraemia | 23 (22.8%) | 0 | 0 |
| Hyperglycaemia | 21 (20.8%) | 0 | 0 |
| Myalgia | 21 (20.8%) | 0 | 0 |
| CPK elevation | 20 (19.8%) | 2 (2.0%) | 0 |
| Hypokalaemia | 20 (19.8%) | 0 | 0 |
| Pyrexia | 18 (17.8%) | 7 (6.9%) | 1 (1.0%) |
| Rash | 15 (14.9%) | 2 (2.0%) | 0 |
| Skin mass | 10 (9.9%) | 1 (1.0%) | 0 |
| Hematological AEs | | | |
| Thrombocytopenia | 76 (75.2%) | 50 (49.5%) | 6 (5.9%) |
| Anemia | 25 (24.8%) | 12 (11.9%) | 2 (2.0%) |
| leukopenia | 21 (20.8%) | 20 (19.8%) | 0 |

The compound of formula (I-A) showed the potent anti-leukemic activities at doses ≥12 mg QOD. In sixty-eight (67%) evaluable patients, the compound of formula (I-A) showed potent anti-leukemic activities in CML patients. In the 68 evaluable patients with non-CHR at baseline, 63

Figure 6A:
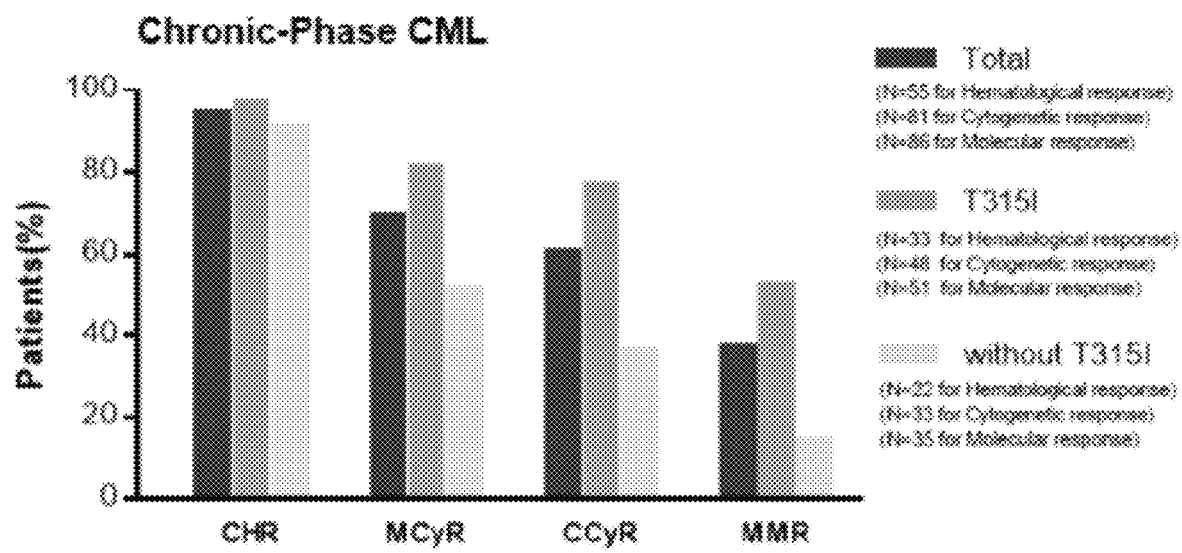
FIGS. 6A and 6B illustrate the efficacy of the compound of formula (I-A) in a phase 1 study.
Figure 6B:
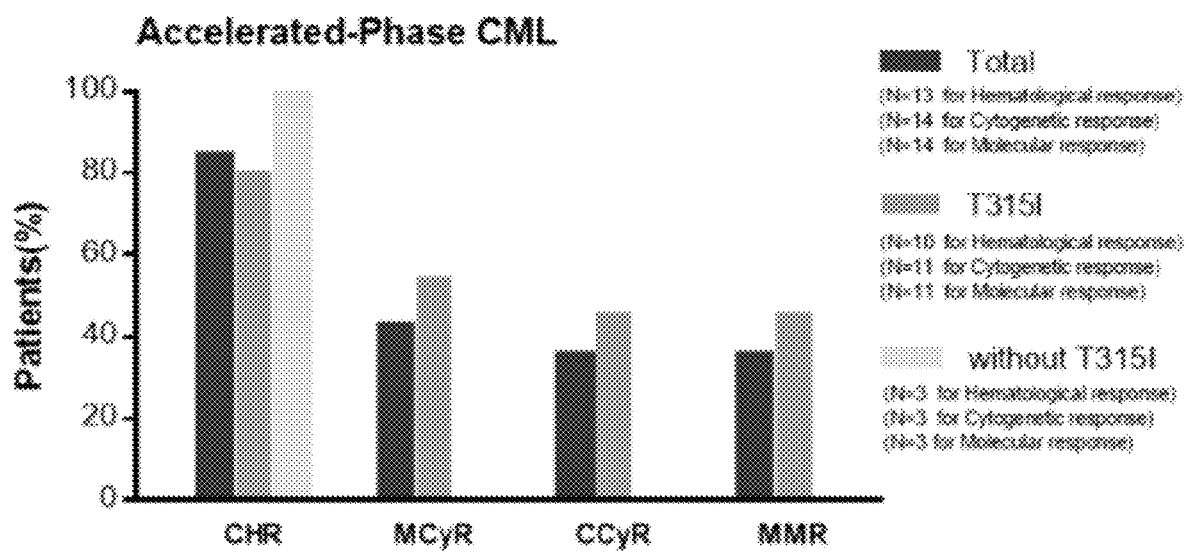
Figure 7A:
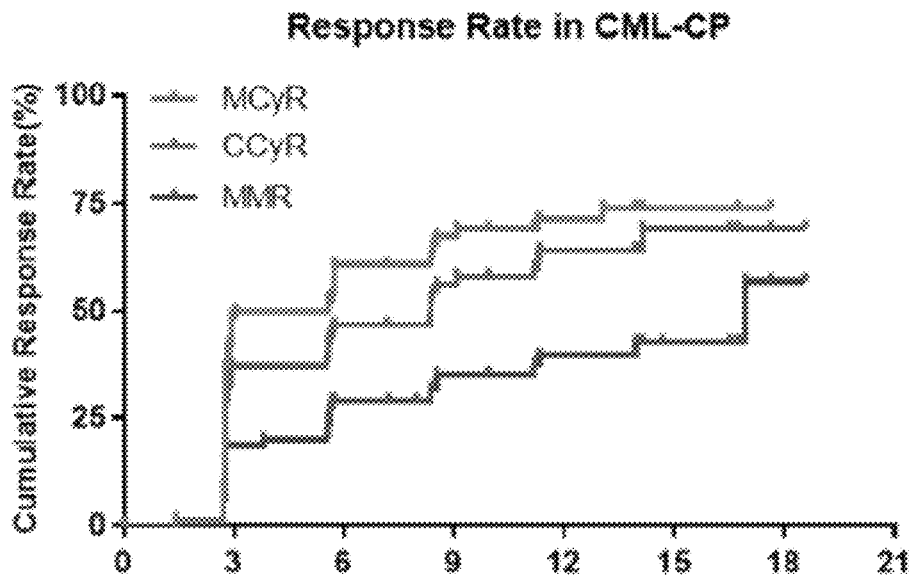
FIG. 7A illustrates the response rate and the depth of response of the compound of formula (I-A) in CML-CP patients, Example 2.

(92.6%) achieved CHR including 52 out of 55 (94.5%) CP patients and 11 out of 13 (84.6%) AP patients, respectively. In the 95 evaluable patients with non-CCyR at baseline, 56 out of 81 (69.1%) CP patients achieved MCyR including 49 (60.5%) CCyR; and 6 out of 14 (42.9%) AP patients, achieved MCyR including 5 (35.7%) CCyR, respectively. In the 100 evaluable patients, 32 out of 86 (37.2%) CP patients and 5 out of 14 (35.7%) AP patients achieved MMR, respectively. The compound of formula (I-A) showed highly efficacious in the patients with T315I mutation (Table 4, FIG. 6A, 6B). The response rate and the depth of response tended to be time dependent (FIG. 7A).

in the patients with TKI-resistant CML, including those patients with T315I mutation. The progression free survival (PFS) rate at 18-month was 94% in the CP patients and 61% in the AP patients.

In preclinical in vivo studies, compound of the formula (I-A) induced complete regression of subcutaneous tumors in a human CML xenograft model and an isogenic model derived from murine Ba/F3 cells expressing BCR-ABL$^{WT}$ or BCR-ABL$^{T315I}$ mutants, and significantly improved the survival rate of isogenic leukemia mice carrying Ba/F3 cells having BCR-ABL$^{WT}$ or BCR-ABL$^{T315I}$. For a mouse model of Ba/F3 tumor carrying BCR-ABL$^{T315I}$, the (I-A) com-

TABLE 4

Phase I Trial in CML: Efficacy Summary

| Variable | CP-CML Patients | | | AP-CML Patients | | |
|---|---|---|---|---|---|---|
| | All Patients | With T315I mut. | Without T315I mut. | All Patients | With T315I mut. | Without T315I mut. |
| Population | 87 | 51 | 36 | 14 | 11 | 3 |
| Hematological response[1]-n( %) | | | | | | |
| No. of evaluable subject-n | 55 | 33 | 22 | 13 | 10 | 3 |
| Complete hematological response-n(%) | 52 (94.5%) | 32 (97.0%) | 20 (90.9%) | 11 (84.6%) | 8 (80.0%) | 3 (100.0%) |
| Cytogenetic response[2]-n(%) | | | | | | |
| No. of evaluable subject-n | 81 | 48 | 33 | 14 | 11 | 3 |
| Major cytogenetic response-n(%) | 56 (69.1%) | 39 (81.3%) | 17 (51.5%) | 6 (42.9%) | 6 (54.5%) | 0 |
| Complete cytogenetic response-n(%) | 49 (60.5%) | 37 (77.1%) | 12 (36.4%) | 5 (35.7%) | 5 (45.5%) | 0 |
| Molecular response[3] | | | | | | |
| No. of evaluated subject-n | 86 | 51 | 35 | 14 | 11 | 3 |
| Major/Complete molecular response-n(%) | 32 (37.2%) | 27 (52.9%) | 5 (14.3%) | 5 (35.7%) | 5 (45.5%) | 0 |
| Complete molecular response-n(%) | 18 (20.9%) | 15 (29.4%) | 3 (8.6%) | 2 (14.3%) | 2 (18.2%) | 0 |

[1]Only the subjects who have at least one hematological assessment post study treatment are included.
[2]Only the subjects who have at least one cytogenetic assessment post study treatment is included.
[3]Only the subjects who have at least one molecular assessment post study treatment is included.

Figure 7B:
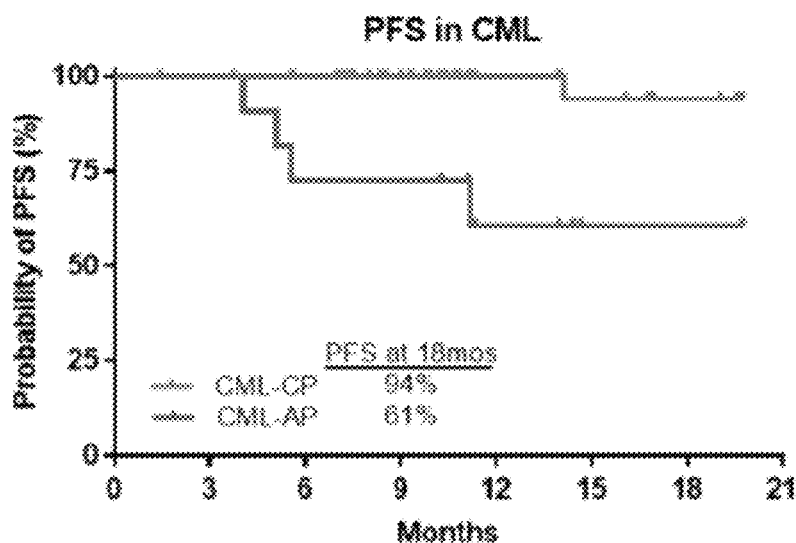
FIG. 7B illustrates the progression free survival (PFS) rate of the compound of formula (I-A) in CML patients.

9 patients (6 CP, 3 AP) had withdrawal from the study, including progressive disease (n=5, 2 CP and 3 AP), intolerant AEs (n=2), consent withdraw (n=1), and secondary breast cancer (n=1). The progression free survival (PFS) rate at 18-month was 94% in the CP patients and 61% in the AP patients (FIG. 7B).

Following a single oral administration of the compound of formula (I-A) at doses from 1-60 mg, the peak concentration of the compound of formula (I-A) was reached between 1-12 h on Day 1, with median Tmax ranging from 4-8 h. The elimination appeared to be linear with a mean terminal $T_{1/2}$ of 17.5 to 36.5 h on Day 1. Peak concentration of the compound of formula (I-A) were observed at 1~12 h on Day 27, With median Tmax ranging from 4-6 h. The mean terminal $T_{1/2}$ ranged from 19.8 to 42.5 h on Day 27 (both of the watching time window is 48 hrs). The mean ratios AUC 0-48 h and Cmax of the compound of formula (I-A) on Day 27 to that on Day 1 ranged from 1.15 to 1.98 and from 0.91 to 1.66, respectively, suggesting moderate accumulation with once every other day dosing regimen. Reduction of CRKL phosphorylation in PBMCs, a biomarker of BCR-ABL inhibition, has shown to be dose and time dependent in 53 evaluable patients treated with the compound of formula (I-A).

Figure 8:
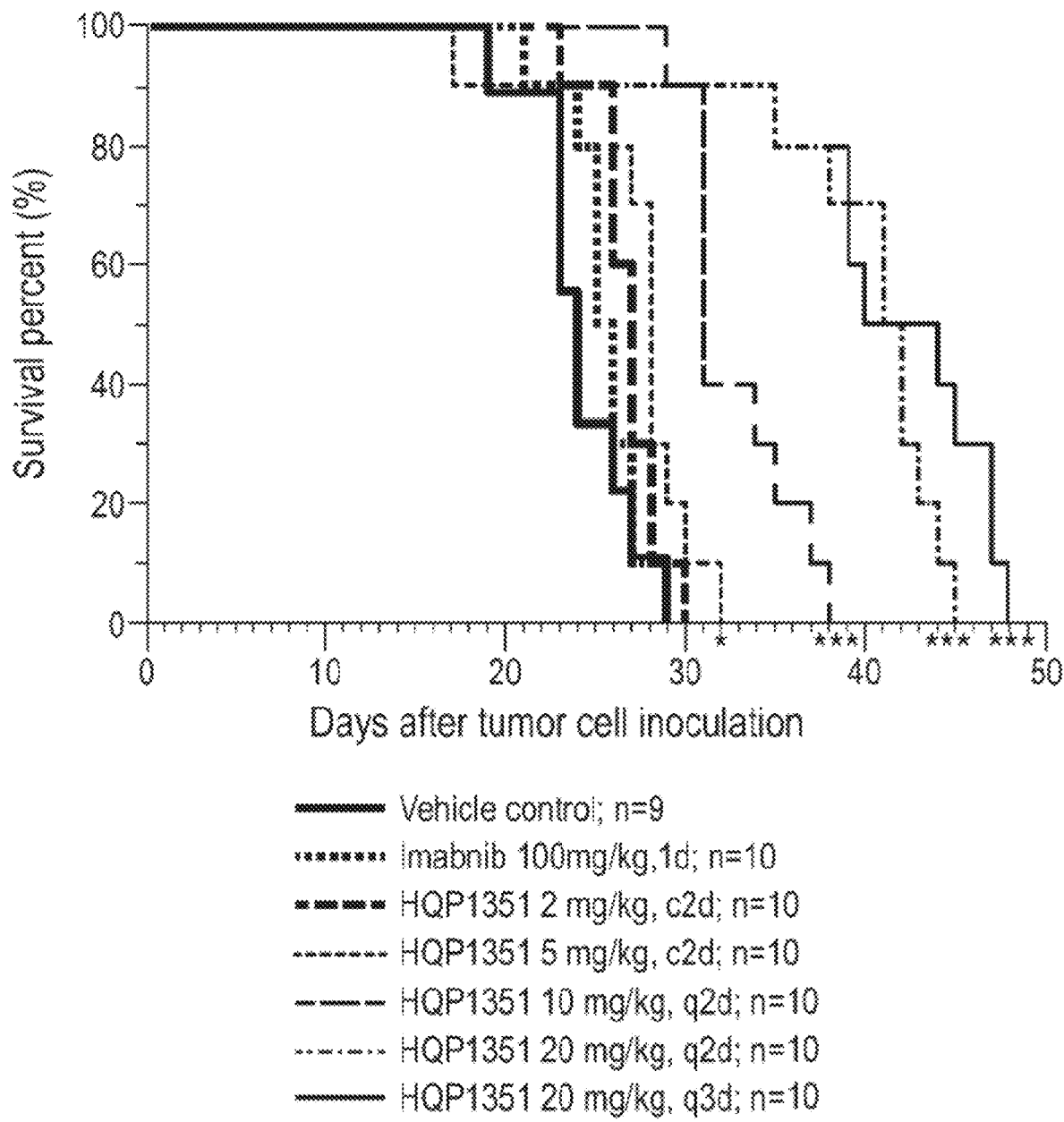
FIG. 8 illustrates the effect of the compound of formula (I-A) on survival of Ba/F3 tumor bearing mice expressing the BCR-ABL$^{T315I}$.

Conclusions: the compound of formula (I-A) exhibits significant and durable antitumor activity, it is well tolerated pound was administered orally once every two days (q2d), or once every three days (q3d), and imatinib was administered once a day (qd) as a control, the results were shown in FIG. 8: compound of the formula (I-A) significantly prolonged the survival of BCR-ABL$^{T315I}$ expressing Ba/F3 tumor bearing mice in a dose-dependent manner Example 3

In this experiment, BCR-ABL complex mutation cells were used to determine the inhibitory effect of the compound of the formula (I-A) and Ponatinib on the proliferation of BCR-ABL complex mutation cells. The experiment proved that the compound of the formula (I-A) was a potential effective medicament capable of overcoming the drug resistance of the Ponatinib. Ba/F3 cells stably expressing BCR-ABL (F359V, H396R, E255K, Y253H, T315I, F317L) mutations were provided by the Institute of Life and Health, Guangzhou Academy of Sciences.

1. The mutated Ba/F3 cell line stably expressing BCR-ABL (E255V, T315M, Y253H/E255V, Y253H/T315I, Y253H/F359V, T315I/F317L, F317L/F359V) mutation was constructed by electro-transformation method, the Ba/F3 cell line stably expressing the BCR-ABL (E255V/T315I, T315I/F359V) mutation was constructed by lentivirus infection method. Cell gene sequencing results confirmed that the BCR-ABL mutant gene was integrated into the genome of Ba/F3 cells. Western blotting results show that the expression of BCR-ABL protein in these cell lines confirmed the validity of the constructed Ba/F3 stably transfected cell line. The cells were cultured in RPMI 1640 (Base media, Cat #L210KJ) medium containing 10% FBS (GIBCO, Cat #10099-41) and 1% Penicillin-Streptomycin double antibodies (Basal Media, Cat #S110JV).

2. Effect of drugs on the proliferation of BaF3 cells stably transfected with BCR-ABL single mutation or complex mutation by WST assay The $IC_{50}$ was calculated using a non-linear regression data analysis method of Graphpad Prism 6.0 software (Golden software, Golden, Colorado, USA).

3. Results

The compound of the formula (I-A) has better antiproliferation effect on Ba/F3 cells with complex mutations of BCR-ABL$^{E255V/T315I}$, BCR-ABL$^{Y253H/E255V}$, BCR-ABL$^{T315M}$, BCR-ABL$^{Y253H/T315I}$, BCR-ABL$^{Y253H/F359V}$, BCR-ABL$^{T315I/F317L}$ than Ponatinib, the $IC_{50}$ value of the compound of the formula (I-A) was 2-9 folds lower than the $IC_{50}$ value of Ponatinib (Table 5). The results suggest that the compound of the formula (I-A) is a potential candidate drug for overcoming the drug resistance of Ponatinib caused by BCR-ABL complex mutation.

TABLE 5

Antiproliferative effect of the compound of the formula (I-A) on Ba/F3 cells with a single or complex mutation of BCR-ABL

| Mutation Region | Ba/F3 containing BCR-ABL mutation | Antiproliferation Effect ($IC_{50}$, nM) | | | | |
|---|---|---|---|---|---|---|
| | | Imatinib | Nilotinib | Dasatinib | Ponatinib | the compound of the formula (I-A) |
| Wild Type | Wild Type | 565 ± 656 | 31 ± 4 | 10 ± 3 | 11 | 6 ± 3 |
| Substrate Binding Region | F359V | 9626 ± 481 | 4643 ± 2260 | 2161 ± 1090 | 2173 ± 1481 | 281 ± 187 |
| A-Ring | H396R | 9179 ± 1303 | 4665 ± 799 | 1641 ± 1180 | 2035 ± 1024 | 274 ± 82 |
| P-Ring | E255K | 8222 ± 484 | 648 ± 395 | 14 ± 1 | 49 ± 4 | 22 ± 13 |
| | Y253H | 8936 ± 1.774 | 497 ± 122 | 11 ± 2 | 37 ± 1 | 7 ± 1 |
| | E255V | 4030 ± 980 | 493 ± 163 | 18 ± 7 | 42.5 ± 17 | 13.5 ± 1 |
| Housekeeping Gene | T315I | 12620 ± 28 | 3425 ± 650 | 2525 ± 322 | 33 ± 11 | 24 ± 10 |
| Hinge Region | F317L | 526 ± 56 | 89 ± 8 | 11 ± 1 | 7 ± 1 | 8 ± 3 |
| Complex Mutation | E255V/T315I | >10000 | 6467 ± 4431 | 3571 ± 1385 | 244 ± 125 | 26 ± 11 |
| | T315M | >10000 | >10000 | 14937 ± 10597 | 1987 ± 1414 | 217 ± 131 |
| | Y253H/E255V | >10000 | 7026 ± 2183 | 231 ± 92 | 772 ± 220 | 122 |
| | T315I/F359V | >10000 | 1944 ± 149 | 3472 ± 711 | 17 ± 2 | 7 ± 1 |
| | F317L/F359V | 3455 | 354 | 25 | 14 | 12 |
| | T315I/F317L | 6576 ± 4453 | 6060 ± 4382 | 3646 ± 2768 | 670 ± 405 | 114 ± 9 |
| | Y253H/F359V | >10000 | 9642 ± 591 | 89 ± 40 | 317 ± 25 | 100 ± 81 |
| | Y253H/T315I | >10000 | >10000 | 4767 ± 935 | 978 ± 57 | 111 ± 1 |

The solution of the sample (the compound of the formula (I-A) or Ponatinib) to be tested with a 9-dose concentration obtained by serial dilution was added proportionally at 100 µl/well in a 96-well culture plate. The dilution was used as a cell blank control (excluding the sample to be tested, which was added to the cells). In addition, a negative control (excluding the sample to be tested and cells) was prepared. In addition to the negative control wells, 100 µl of complete medium cell suspension was added to each well. The dilution was added to the negative control wells at 100 µl/well. 3 repeated wells were set in the experiment. Cells were incubated for 72 hours at 37° C. in a $CO_2$ incubator. 20 µl of CCK-8 detection solution (Shanghai Life iLab Biotech Co., LTD, Cat #D3100L4057) was added to each well, incubating at 37° C. for 2 hours in a $CO_2$ incubator. The OD value was measured at A450 nm by a microplate reader.

The percentage of cell viability was calculated using the following formula:

(O.D. test well-O.D. negative control well)/(O.D. cell control well-O.D. negative control well)× 100

We claim:

1. A method for treating cancer in a patient, comprising orally administering to the patient once every other day (QOD) a therapeutically effective amount of a compound of formula (I-A):

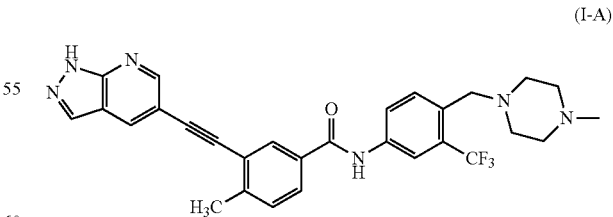

(I-A)

or a pharmaceutically acceptable salt thereof, wherein the cancer is chronic myeloid leukemia caused by BCR-ABL mutation that is resistant to ponatinib, wherein the BCR-ABL mutation is T315I.

2. The method of claim 1, wherein the BCR-ABL mutation is BCR-ABL$^{E255V/T315I}$ or BCR-ABL$^{Y253H/T315I}$.

3. The method of claim 1, wherein the therapeutically effective amount is from about 1 mg to about 100 mg.

4. The method of claim 1, wherein the therapeutically effective amount is from about 1 mg to about 80 mg.

5. The method of claim 1, wherein the therapeutically effective amount is from about 1 mg to about 60 mg.

6. The method of claim 1, wherein the therapeutically effective amount is about 1 mg, about 2 mg, about 4 mg, about 8 mg, about 12 mg, about 20 mg, about 30 mg, about 40 mg, about 45 mg, about 50 mg, or about 60 mg.

7. The method of claim 1, wherein the compound of formula (I-A) or a pharmaceutically acceptable salt thereof, is formulated in a solid dosage form.

8. The method of claim 6, wherein the compound of formula (I-A), or pharmaceutically acceptable salt thereof is administered once every other day (QOD) during a 28-day treatment cycle.

9. The method of claim 1, wherein the chronic myeloid leukemia is relapsed chronic myeloid leukemia.

10. The method of claim 1, wherein the chronic myeloid leukemia is refractory chronic myeloid leukemia.

* * * * *